US006715362B2

(12) United States Patent
Chiapuzzi et al.

(10) Patent No.: US 6,715,362 B2
(45) Date of Patent: *Apr. 6, 2004

(54) SCREWER TEST BENCH COMPRISING A BRAKING DEVICE FOR RESISTING TORQUE SIMULATION

(75) Inventors: Angelo Chiapuzzi, Noviglio (IT); Luigi Bareggi, Milan (IT)

(73) Assignee: BLM S.a.s. di L. Bareggi & C., Cusano Milanino (IT)

( * ) Notice: Subject to any disclaimer, the term of this patent is extended or adjusted under 35 U.S.C. 154(b) by 0 days.

This patent is subject to a terminal disclaimer.

(21) Appl. No.: 10/251,845

(22) Filed: Sep. 23, 2002

(65) Prior Publication Data

US 2003/0057034 A1 Mar. 27, 2003

(30) Foreign Application Priority Data

Sep. 25, 2001 (IT) ..................................... MI2001A1992

(51) Int. Cl.[7] ................................................ F16B 31/02
(52) U.S. Cl. ............................. 73/761; 73/760; 73/1.09; 73/862.08
(58) Field of Search ......................... 73/760, 761, 1.09, 73/862.08

(56) References Cited

U.S. PATENT DOCUMENTS

| 5,886,246 | A | * | 3/1999 | Bareggi et al. .............. 73/1.09 |
| 6,502,674 | B2 | * | 1/2003 | Rheinheimer et al. . 188/251 M |
| 2003/0056564 | A1 | * | 3/2003 | Chiapuzzi et al. ........... 73/1.09 |
| 2003/0056605 | A1 | * | 3/2003 | Chiapuzzi et al. ....... 73/862.21 |

* cited by examiner

Primary Examiner—Edward Lefkowitz
Assistant Examiner—Alandra N. Ellington
(74) Attorney, Agent, or Firm—Jacobson Holman PLLC

(57) ABSTRACT

A screwer test bench including a coupling designed for coupling with the head of a screwer and a controlled braking unit. A sensor unit detects mechanical magnitudes transmitted between the coupling and the braking unit. The braking unit includes a brake with carbon friction surfaces in an oil bath.

5 Claims, 1 Drawing Sheet

SCREWER TEST BENCH COMPRISING A BRAKING DEVICE FOR RESISTING TORQUE SIMULATION

BACKGROUND OF THE INVENTION

The present invention relates to a screwer test bench and in particular to a bench with an innovative braking device for resisting torque simulation.

In the prior art, screwer test benches are well known. Such benches simulate the resisting torque of a screw in tightening and at the same time measure the parameters of torque and angle developed by a screwer applied to the bench and signal deviations of said parameters from a predetermined characteristic curve.

In such benches correct simulation of resisting torque is the most critical part in order that the measurements made be truly representative of the operation of the screwer in normal use.

In accordance with a known system the bench comprises a cap with which is engaged the screwer being tested. A friction disk is thrust against the cap to produce the braking force.

Known systems are based on brake types realized in accordance with the engineering teachings for normal brakes used for stopping rotating shafts such as the brakes used in wheeled vehicles. In these brakes it is important however to have adequate overall braking force upon brake operation without interest for any small braking force oscillations around the mean value during the braking action. In practice, in these known brakes care is had only that the braking force oscillations around the mean value not reach a value such as to produce vibrations noticeable to the vehicle user. In addition, any differences in the friction coefficient are readily compensated for by a greater pressure by the user on the brake.

The holder of this application has noted however that in known systems small oscillations or tripping of the brakes used are generated which are in good part due to the differences between static and dynamic friction and generate effects which are absolutely imperceptible and without influence in a braking system whose purpose is merely to stop rotation of a shaft but which are absolutely harmful in a measurement system such as that of screwer test benches while introducing errors in the measurement of the performance of screwers subjected to testing and especially near stopping.

The general purpose of the present invention is to remedy the above mentioned shortcomings by making available a screwer test bench equipped with an innovative friction brake which would be free of those oscillation and tripping problems which make measurement inaccurate.

SUMMARY OF THE INVENTION

In view of this purpose it was sought to provide in accordance with the present invention a screwer test bench comprising a coupling designed for coupling with the head of a screwer and connected to a controlled braking unit and a sensor unit for detection of mechanical magnitudes transmitted between the coupling and the braking unit characterized in that the braking unit comprises a brake with carbon friction surfaces in an oil bath.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
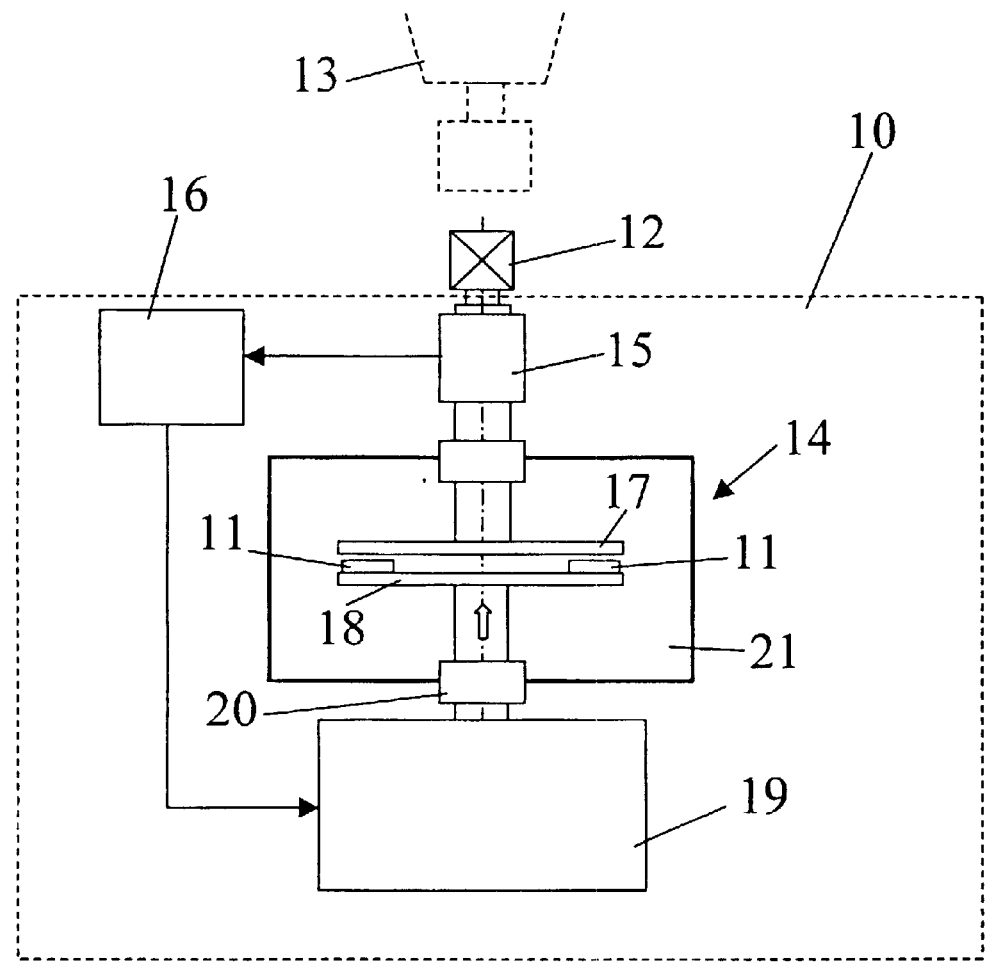
FIG. 1 shows a diagrammatic view of a screwer in accordance with the present invention.

With reference to the FIGS., FIG. 1 shows diagrammatically a test bench designated as a whole by reference number 10. From the bench projects a known coupling 12 designed for coupling with the head 13 of a known screwer to be tested. The coupling 12 is connected to a braking unit 14 with the interposition of a known sensor unit 15 for detection of mechanical magnitudes such as torque and angle transmitted from the coupling to the braking unit. The sensor unit is connected to an acquisition and control device 16, for example with microprocessor, of the prior art and therefore not further shown nor described. During the testing phases of a screwer the device 16 appropriately commands the braking unit 14 and detects through the sensor unit 15 the characteristics of the screwer to establish its correspondence to previously established testing parameters. These measurements and verifications are known to those skilled in the art and therefore not further described nor shown.

The braking unit 14 comprises a brake with friction surfaces 11 realized of carbon and held in an oil bath 21. The structure shown provides advantageously at least one cap 17 caused to rotate by the screwer and which is braked by at least one friction disc 18 supporting the carbon friction surfaces. To thrust the disk against the cap the braking unit comprises an actuator 19 advantageously of the hydraulic type and controlled by the device 16. To allow axial movement the braking disk 18 is supported on the frame through a collar 20 for axial guidance and to prevent rotation.

Figure 2:
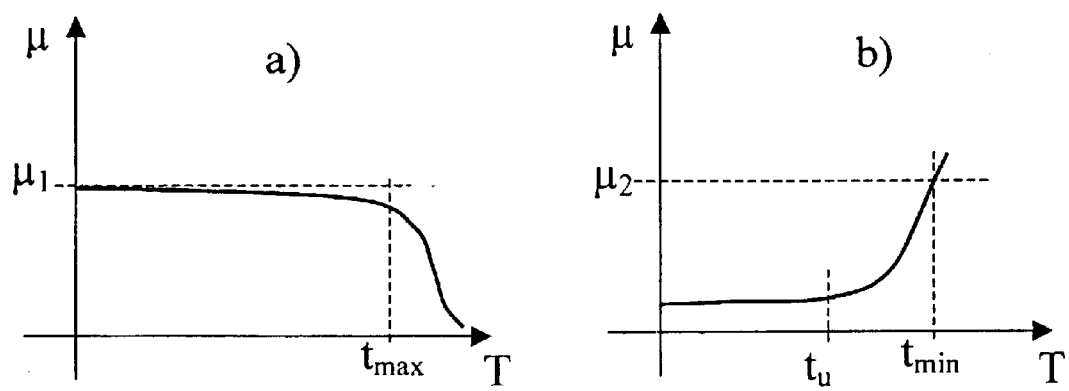
FIG. 2 shows curves of the variations of the temperature friction coefficient.

It should be noted that the use of carbon surfaces in an oil bath brake is quite atypical in the field of braking systems and conflicts with the teachings of engineering in this field. However, in the specific field of screwers this solution surprisingly proved to be extremely advantageous. FIG. 2a shows diagrammatically the generic behaviour with temperature change of a normal friction surface (for example, brake lining material) which is also used in conventional oil bath brakes. As may be seen from the curve, the friction coefficient is held around a high value $\mu_1$ until it reaches a temperature $t_{max}$ after which it decreases rapidly. For this reason brakes with conventional friction surfaces not of carbon have to be cooled adequately to avoid exceeding the maximum operating temperature beyond which the friction surfaces become ineffective. For this reason there have been proposed for example oil bath brakes in which the oil acts as a cooling fluid. Even at operating temperature brakes with conventional friction surfaces suffer from micro-oscillations in the braking action which make them a nuisance in the use of a screwer measurement bench.

FIG. 2b shows diagrammatically the generic behavior of the first section of the friction temperature coefficient curve for carbon friction surfaces. As may be seen, the friction coefficient is rather low until the brake reaches a relatively high temperature, in general over 300° C., to then start rising rapidly until it reaches substantial friction coefficients. For this reason the first section of the curve is never used in normal carbon brakes. Contrary to brakes with more conventional friction surfaces, carbon brakes are brakes which operate only when their temperature is high. For this reason they are not cooled brakes and the operating temperature which must always be held above a value $t_{min}$ to have an acceptable friction $\mu_2$ can be on the order even of almost a thousand degrees centigrade. For this reason, for the brake engineer it is absolutely an unacceptable absurdity to use carbon surfaces in an oil bath brake.

The filer of the present application has however found that in the initial zone of the curve below the temperature $t_{min}$ the friction coefficient is low but there is no appreciable skipping or oscillation which could disturb the measurements in a screwer test bench but which are present in brakes with friction surface having behavior of the FIG. 2a type. In addition the friction coefficient below temperature $t_{min}$, although insufficient for use in high performance conventional brakes, is adequate for the braking heeds in screwer test benches if friction surfaces are appropriately sized. In addition, in this initial section the friction coefficient is adequately constant with temperature change and especially it is virtually free of differences between dynamic and static friction so that there are no "slip-stick" effects and oscillations are therefore avoided.

In the brake in accordance with the present invention the friction surfaces are therefore made of carbon and in an oil bath so as to hold the temperature below a predetermined threshold above which the curve abandons the relative constancy of the friction coefficient.

In particular it has been found advantageous to hold the carbon friction surface at a temperature less than 250° C. and in particular below 150° C. The optimal operating range can advantageously be between 20° C. and 100° C.

In addition, it was found advantageous that the carbon friction surfaces brake against steel surfaces. The disk 17 is therefore advantageously made of steel.

Even if the carbon brake is used at a temperature at which the friction coefficient is relatively low, allowance must be made for the fact that the specific pressures admitted using carbon are much higher than with other friction materials. It is thus possible to obtain satisfactory efficiency of the brake. In addition, the greater efficiency of the carbon brake allows reduction of the diameters with resulting reduction of the moment of inertia and resulting increase in the resonance frequency.

It is now clear that the predetermined purposes have been achieved by making available a screwer test bench providing high precision and measurement repeatability.

Naturally the above description of an embodiment applying the innovative principles of the present invention is given by way of non-limiting example of said principles within the scope of the exclusive right claimed here. For example the exact structure and proportions of the various parts of the bench as well as the existence or not of other prior art parts may vary depending on the specific requirements of the bench embodiment. In addition the brake can also be made with several disks and braking surfaces and/or even braking surfaces on both sides of the disk.

What is claimed is:

1. Screwer test bench comprising a coupling designed for coupling with the head of a screwer and connected to a controlled braking unit and a sensor unit for detecting mechanical magnitudes transmitted between the coupling and the braking unit, the braking unit comprises a brake with carbon friction surfaces in an oil bath.

2. Bench in accordance with claim 1, wherein the carbon friction surfaces brake against steel surfaces.

3. Bench in accordance with claim 1, wherein the carbon friction surfaces are held at a temperature less than 250° C. adn in particular less than 150° C.

4. Bench in accordance with claim 1, wherein the brake comprises at least one cap connected to the coupling and at least one braking disk supporting the carbon friction surfaces and which is thrust on command against said cap by an actuator.

5. Bench in accordance with claim 4, wherein the braking disk runs in an axial guide collar.

* * * * *